United States Patent [19]

Erickson

[11] Patent Number: 5,229,584
[45] Date of Patent: Jul. 20, 1993

[54] ENCOUNTER BILLING SYSTEM

[75] Inventor: Daryl R. Erickson, Amherst, N.H.

[73] Assignee: Missions Marketing, Inc., Amherst, N.H.

[21] Appl. No.: 665,350

[22] Filed: Mar. 6, 1991

[51] Int. Cl.⁵ .............................................. G06F 15/20
[52] U.S. Cl. .................................... 235/375; 235/376; 235/472; 364/922.1; 364/922
[58] Field of Search ............... 235/375, 376, 385, 380, 235/462, 472; 364/413.02, 705.06, 918.1, 922, 922.1

[56] References Cited

U.S. PATENT DOCUMENTS

| | | | |
|---|---|---|---|
| 4,481,412 | 11/1984 | Fields | 235/472 |
| 4,491,725 | 1/1985 | Pritchard | 235/375 |
| 4,516,016 | 5/1985 | Kodron | 235/472 |
| 4,825,058 | 4/1989 | Poland | 235/472 |
| 4,850,009 | 7/1989 | Zook et al. | 235/375 |
| 4,857,716 | 8/1989 | Gombrich et al. | 235/472 |
| 4,916,411 | 4/1990 | Gombrich | 235/380 |
| 4,954,699 | 9/1990 | Coffey et al. | 235/375 |
| 4,991,091 | 2/1991 | Allen | 364/413.02 |
| 5,047,615 | 9/1991 | Fukumoto et al. | 235/375 |

OTHER PUBLICATIONS

Design Engineering-Dec. 1979-p. 13.

Primary Examiner—Joseph E. Clawson, Jr.
Assistant Examiner—Tan Nguyen
Attorney, Agent, or Firm—Choate, Hall & Stewart

[57] ABSTRACT

The system includes bar code reading apparatus which communicates with a hand held computer. The computer includes an encounter, diagnosis and procedure data base stored in memory. Bar coded procedure and diagnosis information readable by the bar code reader is provided. The computer is programmed to determine a level of service from the encounter information selected by the healthcare provider. The system provides an accurate way of assessing the appropriate level of encounter and it provides a compact, rapid method of collecting all data necessary to generate an accurate bill resulting from an encounter between a patient and a healthcare provider.

14 Claims, 7 Drawing Sheets

ENCOUNTER BILLING SYSTEM

BACKGROUND OF THE INVENTION

This invention relates to a billing system which documents the encounter between a healthcare provider and a patient.

In the age of third party payments, it is essential for billing purposes that the appropriate level of service be recorded for each provider-patient encounter. If the level of service recorded is higher than the level of service actually performed, the healthcare provider is subject to liability for over charging. On the other hand, if the level of service recorded is lower than that actually performed, the healthcare provider loses money. Because the potential liability for over billing is so high, healthcare providers routinely tend to record the level of an encounter lower than warranted by services actually delivered so as to forestall a charge of over billing. There is therefore a need for accurately determining and recording the appropriate level of encounter when a healthcare provider renders services. In addition to assigning accurately a level of service, it is also important for a healthcare provider to record accurately and promptly procedures performed on a patient and the diagnosis or diagnoses which prompted the encounter. The present invention offers the healthcare provider a hand-held apparatus for quickly and accurately recording data essential for accurate and appropriate patient billing.

SUMMARY OF THE INVENTION

The encounter billing system according to a preferred embodiment of the invention includes a bar code-reading hand-held computer which is programmed to gather patient identification and other information including time and place of an encounter, determine a level of encounter, record a procedure or procedures, and record the appropriate diagnosis or diagnoses. Appropriately bar-coded lists of procedures and diagnoses are provided. Because a patient's identification number, procedure codes and diagnostic codes can be represented by bar codes, this data can be rapidly and easily entered into the computer by passing the bar code reader across the encoded information. The computer is programmed to determine a level of service after the provider has selected the appropriate elements performed in an encounter from a list of elements presented to him/her by the computer. Each element of an encounter has a relative value so that when the values of the selected elements are summed, an objective measurement of the encounter is determined. In an example embodiment, the level of service is minimal when the total is in the range of 1-9; brief when the total is in the range 10-19; limited when the total is in the range 20-29; intermediate when the total is in the range 30-40; extended when the total is in the range 41-54; and comprehensive when the total is greater than 54. The level of encounter and the bar coded data are stored in a data file which can be transferred from the hand held computer to a remote computer or chain of computers as desired.

DESCRIPTION OF THE PREFERRED EMBODIMENT

As discussed generally above, the present invention facilitates the generation of an accurate encounter billing form for health care providers as well as an accurate record of time use and productivity for individual health care providers. A billing system must meet certain requirements. First, the patient must be identified along with the time and date of the encounter. Further, the particular provider must be identified and the place of the encounter recorded. Most importantly, the appropriate encounter level must be selected, based on objective criteria, so that the patient is neither under, nor over, billed. If a procedure or procedures are performed, they must be properly listed. The diagnosis or diagnoses which led to the encounter must be accurately recorded as they provide the rationale for the entire service. It is desirable that the system be able to store or unload the data on command.

As will be appreciated by those in the healthcare industry, procedures have been assigned code numbers in *Current Procedural Terminology*, Fourth Edition (CPT-4), American Medical Association, Chicago, Ill., 1989. The CPT-4 is a listing of descriptive terms and identifying codes for reporting medical services and procedures performed by healthcare providers. The purpose of the terminology is to provide a uniform language that will accurately describe medical, surgical, and diagnostic services, and will thereby provide an effective means for reliable nationwide communication among healthcare providers, patients, and third parties. Diagnoses are similarly assigned an ICD-9 code number based upon the *International Classification of Diseases*, 9th Revision, Clinical Modification, (ICD-9-CM), Second Edition, September, 1980.

As is well understood, procedures are interventional activities such as surgery, biopsies or diagnostic tests. Encounters, on the other hand, are typically non-invasive activities performed by a healthcare provider. For billing purposes, encounters are grouped into six categories: minimal, brief, limited, intermediate, extended, and comprehensive. These groupings have been established by CPT-4 so that fees may be established objectively.

Figure 1A:
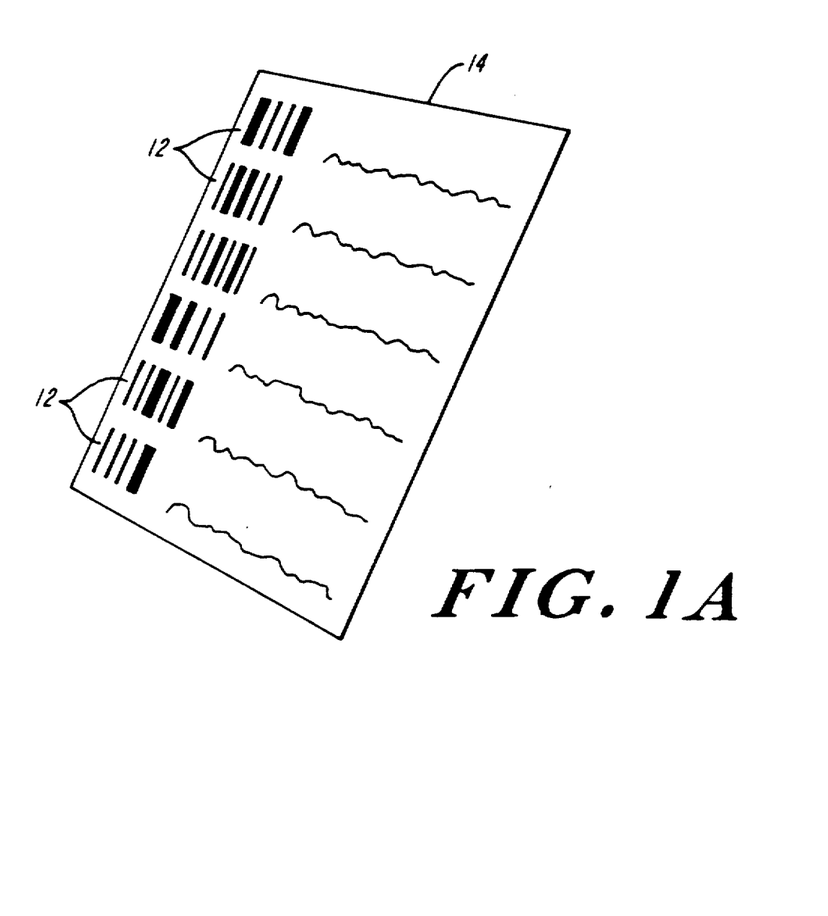
FIG. 1 is a schematic illustration of the encounter billing system of the invention.
Figure 1B:
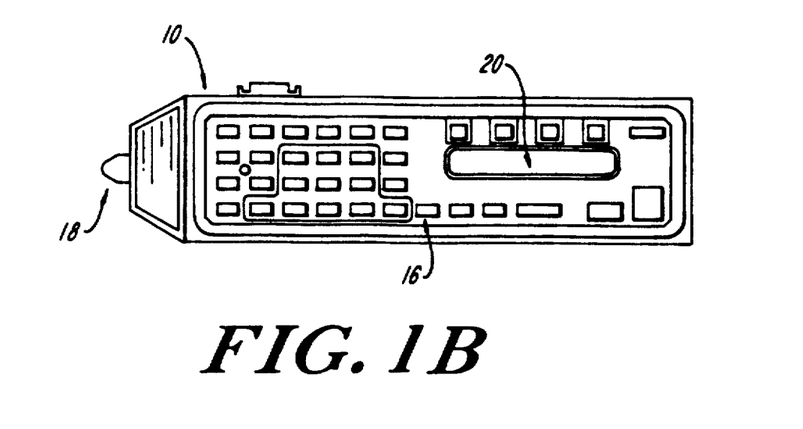

According to a preferred embodiment of the invention, illustrated in FIG. 1, a hand-held bar code reader and computer apparatus 10 is adapted to respond to bar codes 12 on a card 14. In the illustrated embodiment, the apparatus 10 includes an alpha-numeric keyboard 16 for data entry and a display 20. The codes 12 are read by an end portion 18 of the apparatus 10. The card 14 may include information concerning both procedures and diagnoses. Alternatively, several different cards 14 may be provided, each card including only diagnostic information or procedural information. The card 14 may include as many separate pages or surfaces as necessary for setting forth procedures and diagnoses. In particular, the card 14 might be the CPT-4 or ICD-9 book listing procedures with the inclusion of the appropriate bar codes. It is preferred that the bar code reader and computer apparatus 10 be programmed to accept at least six diagnoses and at least six procedures for each patient encounter.

An excerpt from a book form of card 14 appears in the appendix. In this example, all diagnoses are on odd numbered pages, while all procedures are on even numbered pages. For example, one page of the excerpt lists diagnoses concerning cholecystitis and calculi in the gallbladder. The previous page of the excerpt lists procedures corresponding to the diagnoses. The ICD-9 and CPT-4 codes are used in this example. Presenting these two different sets of codes in one manual will allow the healthcare provider to rapidly and accurately find the necessary codes for a procedure and diagnosis.

Each patient can be assigned an identification number that specifically identifies him/her and the location of the encounter. These identification numbers are preferably bar coded and attached to the patient's chart. If, for example, a healthcare provider has performed a procedure on a patient, the healthcare provider can use the bar code reader 18 of the apparatus 10 to identify a patient and locate the patient as to office, hospital, nursing home, etc. It is preferred that this information be bar coded at the time the patient requests medical services. If there is no bar code, the name, birthdate, location, etc., identifying the patient can be entered by means of a keyboard 16.

After an encounter with a patient, the healthcare provider can use the hand-held bar code reader and computer apparatus 10 to scan the appropriate bar codes 12 relating to the procedures the healthcare provider performed on the patient and any diagnoses. The provider can further use the apparatus 10 to record the appropriate level of service for a patient-provider encounter. A key aspect of the present invention is that the apparatus 10 is programmed to compute the level of service from the individual elements performed on the patient during an encounter. As shown in an example embodiment in Table I, encounter elements are assigned a value. After a patient encounter, the healthcare provider can use the apparatus 10 to enter a level of service directly without visualizing the elements or the provider can scroll through the list of elements, selecting those which were performed by the provider and/or his or her staff. After tabulating the appropriate elements, the computer will total the individual values and select the correct level of service according to point breakdown, an example of which appears in Table II.

TABLE I

| Chief Complaint | 3 |
| --- | --- |
| Course of Illness | |
| simple | 3 |
| medium | 6 |
| complex | 9 |
| Past Medical History | 4 |
| Review of Systems | 5 |
| Family History | 3 |
| Social History | 3 |
| Vital Signs | |
| BP | 1 |
| Pulse | 1 |
| Temp. | 1 |
| Resp. Rate | 1 |
| Weight | 1 |
| Physical Exam | |
| one area | 3 |
| two-plus | 6 |
| complete | 10 |
| Evaluate Data | |
| 1 or 2 tests | 2 |
| 3 to 5 tests | 4 |

TABLE I-continued

| 6 or more tests | 8 |
| --- | --- |
| Order Lab/Xray | 3 |
| Diagnosis | 6 |
| Therapy | 6 |
| Discussion | number of minutes |

*1 point/minute

TABLE II

| Level of Service | |
| --- | --- |
| Minimal | 1 to 9 points |
| Brief | 10 to 19 points |
| Limited | 20 to 29 points |
| Intermediate | 30 to 40 points |
| Extended | 41 to 54 points |
| Comprehensive | > 54 points |

Figure 2:
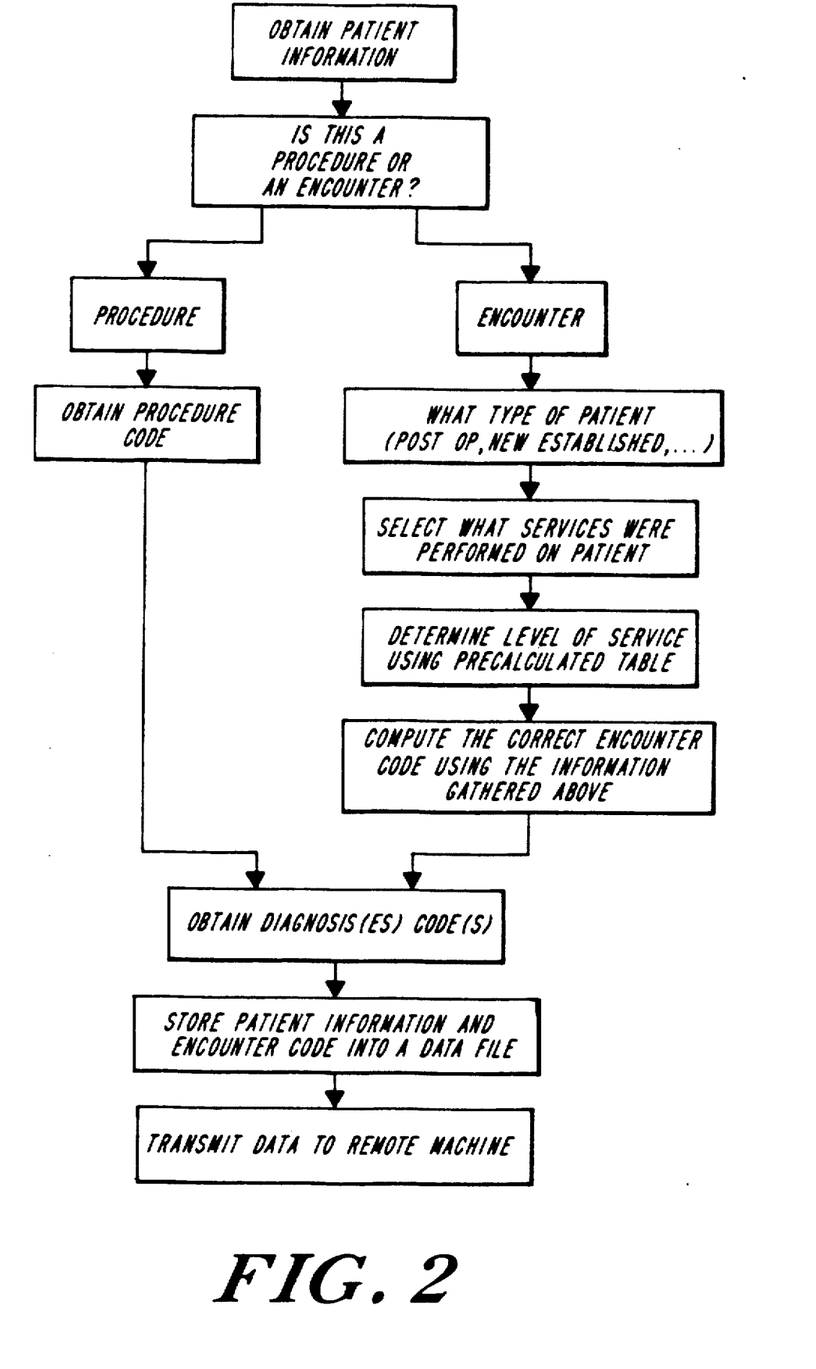
FIG. 2 is a block diagram illustrating the general functions of the encounter billing system of the invention.
Figure 3:
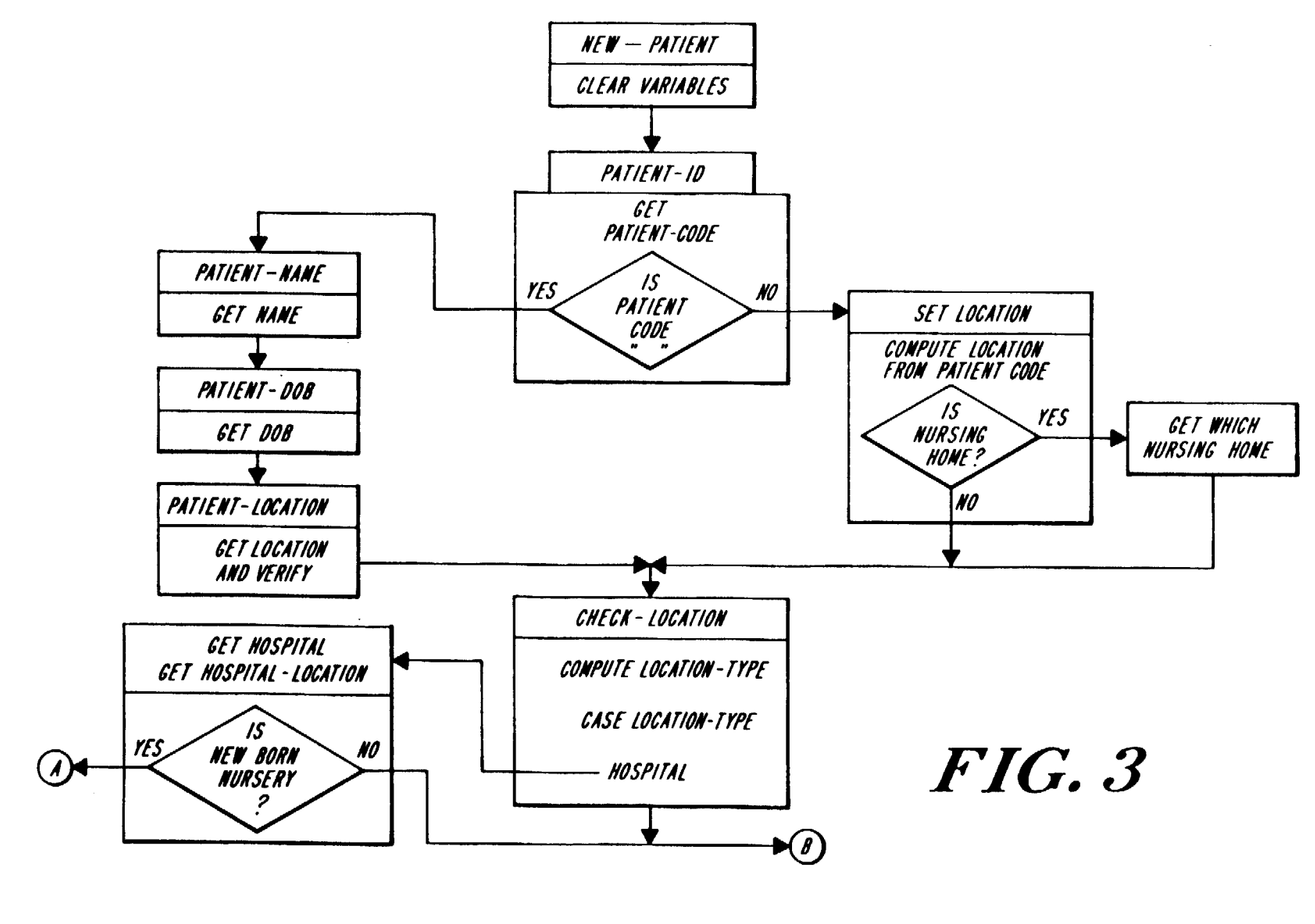
FIG. 3 is a flow chart for one embodiment of the encounter billing system of the invention.
Figure 4:
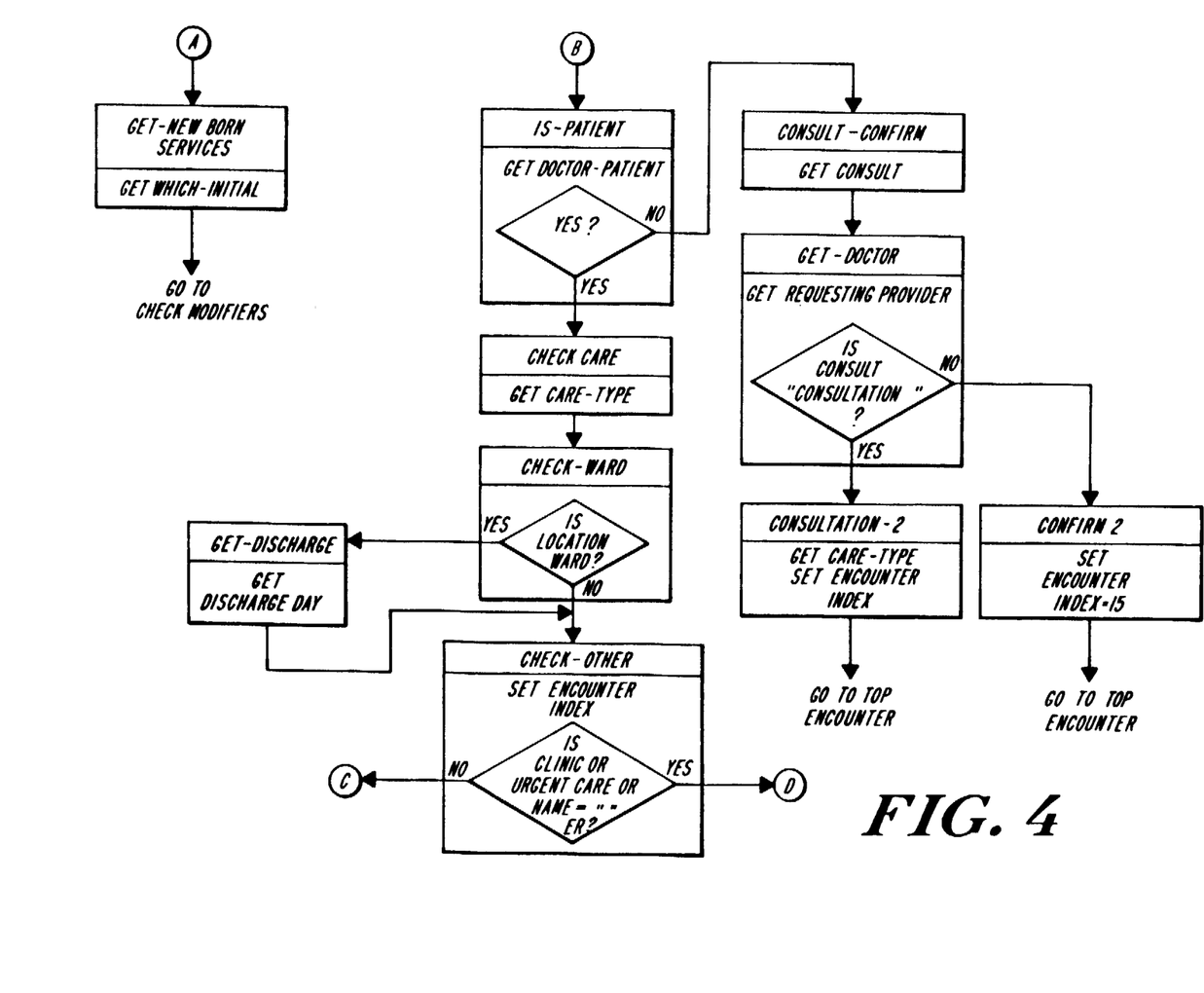
Figure 5:
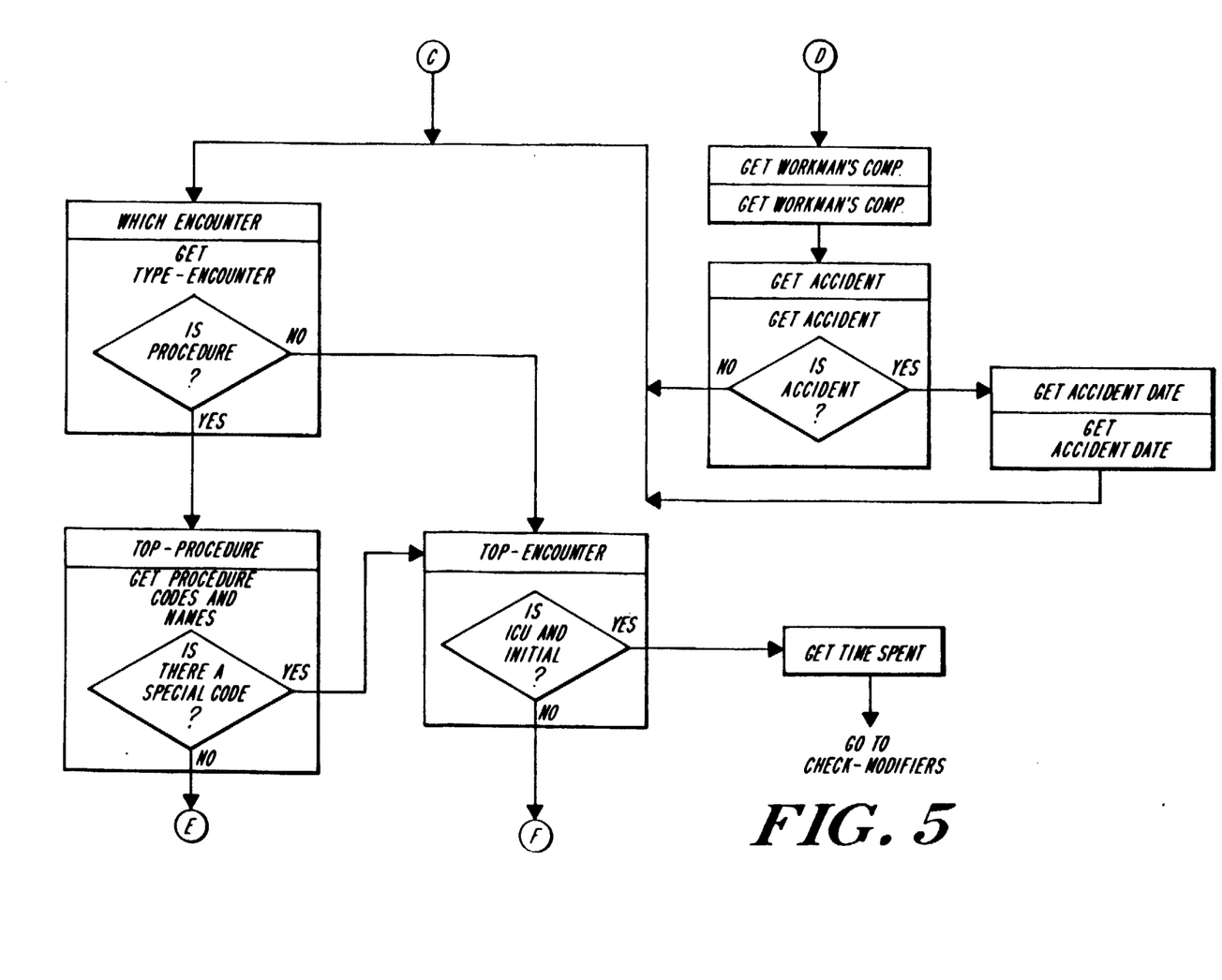
Figure 6:
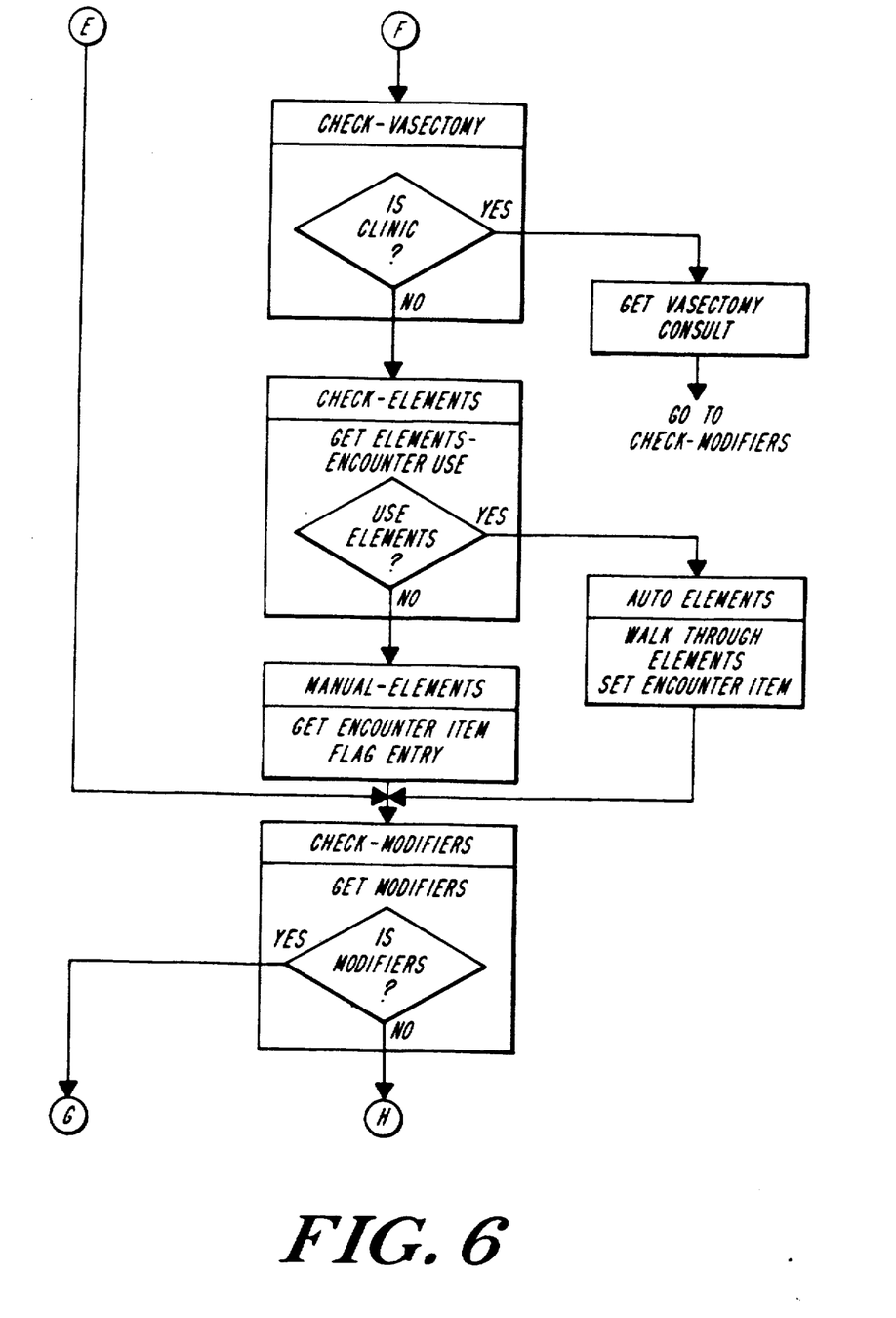
Figure 7:
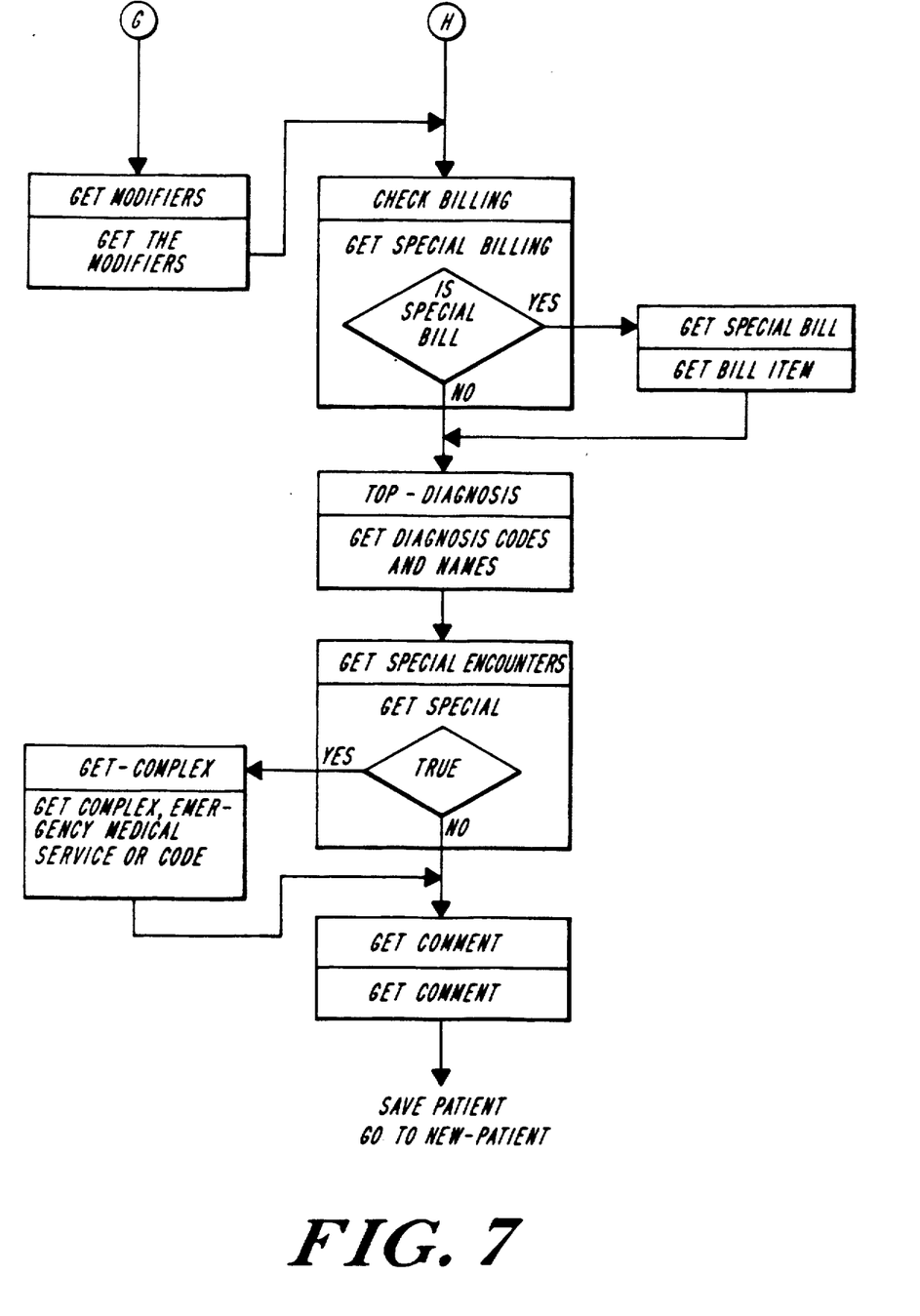

The bar code reader and computer apparatus 10 is programmed generally to carry out the functions shown in FIG. 2. A detailed flow chart of a particular embodiment appears in FIG. 3. First, patient information such as name, birthdate and location of the encounter is obtained and entered using either the keyboard 16 or the bar code reader 18 directly to scan the information. The provider then selects whether he or she is entering a procedure or an encounter. After selecting the procedure mode, the provider scans the appropriate bar codes 12 on the appropriate card 14 to enter the particular procedure or procedures performed on the patient. The patient information and procedure codes are then stored in the apparatus 10. When the encounter mode is selected, the provider can enter information about the patient such as post-operative, new, established, etc. The provider then enters the level of service directly or scrolls through the list of elements so that the computer can assign the correct level of service according to Table II, for example. The appropriate diagnosis or diagnoses are then scanned into the apparatus 10 or entered using the keyboard 16. All of this information is stored in a data bank within the apparatus 10. In a preferred embodiment, the data stored in the apparatus 10 can be transferred to a remote machine when the apparatus 10 is in a holder. Such a remote machine, not shown, can then generate an accurate encounter billing form for charging the patient or a third party payer.

Because the level of service is computed from objective criteria, a patient is appropriately billed. This system eliminates risk to the healthcare provider of an over charge which could result in significant fines or incarceration of the provider.

A suitable bar code reader and computer apparatus is available from Hand Held Products, 8008 Corporate Center Drive, Charlotte, N.C. 28226 (704) 541-1380 (FAX: (704) 541-1333) and can be readily programmed to carry out the procedures illustrated in FIGS. 2 or 3 and, in particular, to compute the level of service from the information in Tables I and II.

It is recognized that modifications and variations of the invention will occur to those skilled in the art, and it is intended that all such modifications and variations be included within the scope of the claims.

APPENDIX

LIVER AND BILIARY SYSTEM

LIVER:

Hepatitis, Viral

A, without coma     *070.1* with coma     *070.0*

B, without coma     *070.3* with coma     *070.2*

Other specified, without coma     *070.5* with coma     *070.4*

Chronic     *571.4*

Toxic     *573.3*

Necrosis, acute and subacute     *570*

Alcoholic fatty liver     *571.0*

Acute hepatitis     *571.01*

Cirrhosis     *571.2*

Unspecified damage     *571.3*

Cirrhosis, without mention of alcohol     *571.5*

Biliary     *571.6*

Chronic yellow atrophy     *571.8*

Fatty liver, without mention of alcohol     *571.8*

Abcess     *572.0*

Amebic     *006.3*

Sequelae of chronic liver disease

Portal pyemia *572.1*

Hepatic coma *572.2*

Portal hypertension *572.3*

Hepatorenal syndrome *572.4*

Postoperative *997.4*

Other *572.8*

Congenital cyst(s) *751.62*

Hepatomegaly *789.1*

Portal vein obstruction *452*

Neoplasm, benign *211.5* malignant, primary *155.0* secondary *197.7* intrahepatic bile ducts *155.1*

BILIARY TRACT

CHOLECYSTECTOMY - 47600 *47600*

CHOLECYSTECTOMY WITH CHOLANGIOGRAPHY - 47605 *47605*

CHOLECYSTECTOMY WITH EXPLORATION OF CBD - 47610 *47610*

CHOLECYSTECTOMY LAPAROSCPIC - not available at this time

CHOLEDOCHOSCOPY, Intraoperative - 47550 *47550*

GALLBLADDER AND BILIARY TRACT

Cholecystitis, acute, calculus in gallbladder  574.0 no caculus  575.0 calculus in common bile duct:

without obstruction  574.30 with obstruction  574.31 chronic, calculus in gallbladder  574.1 no calculus  575.1 calculus in common bile duct:

without obstruction  574.40 with obstruction  574.41

Cholelithiasis, without cholecystitis  574.2

Choledocholithiasis, without cholecystitis:

without obstruction  574.50 with obstruction  574.51

Cholangitis, all forms  576.1

Hydrops (mucocele)  575.3

Perforation  575.4

Fistula  575.5

Nonvisualization  793.3

Postcholecystectomy syndrome  576.0

Spasm of sphincter of oddi  576.5

Congenital choledochal cyst  751.69

| | |
|---|---|
| Other specified disorders of biliary tree | 576.8 |
| Neoplasm, benign | 211.5 |
| malignant: | |
| gallbladder | 156.0 |
| extrahepatic bile ducts | 156.1 |
| ampulla of Vater | 156.2 |
| unable to determine specific site | 156.8 |

What is claimed is:

1. Encounter billing system for recording and encoding procedures, diagnoses, and services of a healthcare provider-patient encounter, and for computing and recording a level of service to be billed, comprising:
   computing apparatus having keyboard entry means and display means, said computing apparatus adapted to accept and store data entered via said keyboard entry means;
   bar code reader adapted to communicate with said computing apparatus, said computing apparatus adapted to accept and store data entered via said bar code reader;
   bar-coded charts readable by said bar code reader to enter and store procedures and diagnoses in said computing apparatus; and
   programs running in said computing apparatus which accept as input, data representing procedures, diagnoses, and services of a given provider-patient encounter, and which further compute from the input a level of service to be billed.

2. The system of claim 1 wherein the programs compute the level of service by assigning and summing weighted values corresponding to entered services, procedures, and diagnoses, the total of the values determining the level of service to be billed.

3. The system of claim 2 wherein the programs compute the level of service to be billed by employing the values shown in Table I in connection with their associated services, and by assigning a level of service based on the total of the values, as shown in Table II, as follows:

TABLE I

| | |
|---|---|
| Chief Complaint | 3 |
| Course of Illness | |
| simple | 3 |
| medium | 6 |
| complex | 9 |
| Past Medical History | 4 |
| Review of Systems | 5 |
| Family History | 3 |
| Social History | 3 |
| Vital Signs | |
| BP | 1 |
| Pulse | 1 |
| Temp. | 1 |
| Resp. Rate | 1 |
| Weight | 1 |
| Physical Exam | |
| one area | 3 |
| two-plus | 6 |
| complete | 10 |
| Evaluate Date | |
| 1 or 2 tests | 2 |
| 3 to 5 tests | 4 |
| 6 or more tests | 8 |
| Order Lab/Xray | 3 |
| Diagnosis | 6 |
| Therapy | 6 |
| Discussion | number of minutes |

*1 point/minute

TABLE II

| Level of Service | |
|---|---|
| Minimal | 1-9 points |
| Brief | 10-19 points |
| Limited | 20-29 points |
| Intermediate | 30-40 points |
| Extended | 41-54 points |
| Comprehensive | >54 points |

4. The system of claim 1 wherein a list of said services of a provider-patient encounter is displayed on said display means, and wherein the programs are adapted to allow a user to select services from said list, the level of service computed from the selected services.

5. The system of claim 1 wherein the bar code reader and the computing apparatus form a unitary apparatus.

6. The system of claim 5 wherein said unitary apparatus is of size and weight such that it is conveniently hand-held.

7. The system of claim 6 wherein said unitary apparatus further includes communication means for communicating with other electronic apparatus from a group consisting of computers, printers, and displays.

8. The system of claim 1 wherein said charts include bar codes for procedures.

9. The system of claim 8 wherein said bar codes correspond to CPT code numbers assigned to said procedures.

10. The system of claim 1 wherein said charts include bar codes for diagnoses.

11. The system of claim 10 wherein said bar codes correspond to ICD code numbers assigned to said diagnoses.

12. The systems of claims 1, 8, 9, 10 or 11 wherein said charts are in the form of pages in a book.

13. An encounter billing method for recording and encoding procedures, diagnoses, and services of a healthcare provider-patient encounter, and for computing and recording a level of service to be billed, comprising:
   encoding procedures, diagnoses, and services of a healthcare provider-patient encounter as coded data;
   entering coded data—representing the procedures, diagnoses, and services of a given encounter—into a computing apparatus having a keyboard entry means and display means, either by said keyboard entry means or by a code reader adapted to communicate with said computing apparatus,
   running programs in said computing apparatus to assign and to sum numerical values associated with the individual procedures, diagnoses, and services entered as coded data, and to compute from the total of the values a level of service to be billed.

14. An encounter billing method for recording and encoding procedures, diagnoses, and services performed during a healthcare provider-patient encounter, and for computing and recording a level of service to be billed, comprising:
   using a computing apparatus having keyboard entry means and display means, said computing apparatus adapted to accept and store data entered via said keyboard entry means;
   using a bar code reader adapted to communicate with said computing apparatus, said computing apparatus adapted to accept and store data entered via said bar code reader;
   using bar-coded charts readable by said bar code reader to enter and store procedures, diagnoses, and services in said computing apparatus; and
   running programs in said computing apparatus which accept as input, data representing services, procedures, and diagnoses of a provider-patient encounter, and which further compute from the input a level of service to be billed.

* * * * *